United States Patent

Doyle, Jr. et al.

[11] Patent Number: 5,364,062
[45] Date of Patent: Nov. 15, 1994

[54] MOUNTING APPARATUS FOR A RAILROAD AIR BRAKE CYLINDER

[75] Inventors: James J. Doyle, Jr., Dracut, Mass.; Scott G. Comstock, Amherst, N.H.

[73] Assignee: Controlair, Inc., Amherst, N.H.

[21] Appl. No.: 100,362

[22] Filed: Aug. 2, 1993

[51] Int. Cl.⁵ .............................................. F16M 3/00
[52] U.S. Cl. ............................. 248/674; 188/153 R; 188/219.1; 248/220.2
[58] Field of Search .............. 248/200, 205.1, 220.2, 248/309.2, 674, 637, 672; 188/361, 153 R, 153 D, 153 A, 205 R, 209, 219.1

[56] References Cited

U.S. PATENT DOCUMENTS

| | | | |
|---|---|---|---|
| 2,212,408 | 8/1940 | Stewart | 188/153 R X |
| 3,104,901 | 9/1963 | Potter | |
| 3,270,221 | 8/1966 | Schaffer | |
| 4,378,864 | 4/1983 | Starne | 188/153 R |
| 4,414,824 | 11/1983 | Durenec | |
| 4,502,656 | 3/1985 | Zeitler | 248/346 |
| 4,964,609 | 10/1990 | Tomell | 248/638 |
| 5,038,896 | 8/1991 | Wirth | 188/153 R |

*Primary Examiner*—Ramon O. Ramirez
*Attorney, Agent, or Firm*—Richard H. Kosakowski

[57] ABSTRACT

Apparatus for mounting an air brake cylinder to a bolster casting of a railroad car includes an adaptor mounting plate disposed contiguous to the surface of the bolster casting. The plate has a plurality of holes formed therein. The bolts are inserted through holes in the bolster casting and through the corresponding holes in the plate. Nuts are torqued onto the bolt shaft to secure the plate to the casting. The adaptor mounting plate also includes a plurality of threaded studs welded thereto. A flange is welded to the cylinder housing at the rod end of the cylinder. The flange has holes formed at its four corners. The flange and cylinder mate with the adaptor mounting plate such that the threaded studs on the plate are inserted through the corresponding holes in the flange. Nuts secure the flange to the plate. Holes are formed in the interior of the cylinder to accommodate the bolts and associated nuts securing the bolster casting to the plate. The apparatus of the present invention allows a single person to complete the entire assembly of the cylinder to the casting.

13 Claims, 3 Drawing Sheets

MOUNTING APPARATUS FOR A RAILROAD AIR BRAKE CYLINDER

BACKGROUND OF THE INVENTION

This invention relates to air brake cylinders for railroad cars, and more particularly, to apparatus for mounting the air brake cylinder to the bolster casting of a railroad car.

It is known in the art of railroad air brakes to mount the brake cylinder directly to the bolster casting. In such an arrangement, two or three bolts are placed through the bolster casting from the inside of the casting, and are screwed into corresponding threaded weld nuts disposed inside the cylinder at its rod end.

However, the shape of the bolster casting and the fact that other objects are mounted to the casting in the vicinity of the cylinder make for difficult accessibility to the two or three bolt heads with a wrench. The assembly of the cylinder to the bolster is further complicated by the relatively heavy weight (e.g., 60-70 pounds) of the cylinder. Thus, assembling the cylinder to the bolster casting is a "two-man job"—one person holding the cylinder outside of the bolster casting and the other person attempting to torque the bolts by placing himself in an awkward position to try to reach the boltheads with a wrench.

The relative inaccessibility of the heads of the bolts disposed within the interior of the bolster casting is better characterized by a general inability to properly position a wrench to apply sufficient torque to the bolts. Thus, the bolts, being inconsistently torqued, frequently loosen over time during operation of the cylinder. Further, the brake cylinder tends to crack due to the constant movement of its mounted surface. Such cracking endangers operation of the railroad car.

Accordingly, it is a primary object of the present invention to provide apparatus that facilitates the proper mounting of an air brake cylinder to the bolster casting of a railroad car.

It is a general object of the present invention to provide apparatus that allows for ease in assembling an air brake cylinder to the bolster casting.

It is a further object of the present invention to reduce the possibility that the air brake cylinder will loosen from its assembly to the bolster casting.

It is yet another object of the present invention to provide apparatus that allows a single person to assemble an air brake cylinder to the bolster casting.

It is still another object of the present invention to reduce the possibility that the air brake cylinder may crack over time because of improper assembly of the cylinder to the bolster casting.

The above and other objects and advantages of the invention will become more readily apparent when the following description is read in conjunction with the accompanying drawings.

SUMMARY OF THE INVENTION

To overcome the deficiencies of the prior art and to achieve the objects listed above, the Applicants have invented apparatus that interfaces an air brake cylinder to the bolster casting.

In the preferred embodiment, the apparatus includes an adaptor mounting plate disposed adjacent to and in an abutting relation to the surface of the bolster casting. The plate has a plurality of holes formed therein. Bolts are inserted through the holes in the bolster casting and through the corresponding holes in the plate. The bolt heads disposed inside the bolster casting have associated lock washers disposed contiguous therewith. Nuts are torqued onto the bolt shafts to secure the plate to the casting. The lock washers keep the bolt heads from turning as the nuts are torqued. The adaptor mounting plate also has a plurality of threaded studs welded thereto. A flange is welded to the cylinder housing at the rod end of the cylinder. The flange, which is generally square in shape, has a plurality of holes formed at its four corners. The flange and cylinder mate with the adaptor mounting plate such that the threaded studs on the plate are inserted through the corresponding holes located at the four corners in the flange. Nuts secure the flange to the plate. Holes are formed in the interior of the cylinder to accommodate the protruding portions of the bolts and associated nuts securing the bolster casting to the plate. In this way, the flange can sit flush against the adaptor mounting plate.

DETAILED DESCRIPTION OF THE PREFERRED EMBODIMENTS

Figure 1:
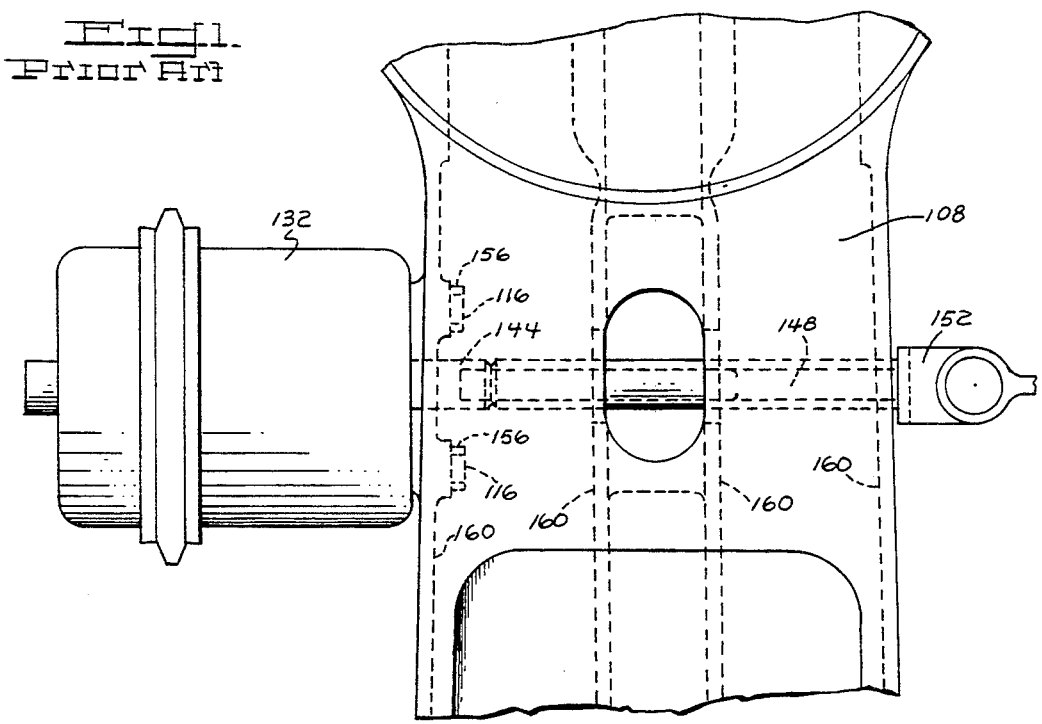
FIG. 1 is a top plan view of a prior art scheme for connecting an air brake cylinder to a bolster casting.

Referring to the drawings in detail, a preferred embodiment of the mounting apparatus of the present invention is generally indicated and designated by the reference number 100. The mounting apparatus 100 includes a mounting plate 104 disposed contiguous to the bolster casting 108. The plate 104 has a plurality of holes 112 formed therein. Bolts 116 are inserted through holes formed in the bolster casting 108 and through the corresponding holes 112 in the plate 104. Nuts 120 are torqued onto the corresponding bolt shafts 116 to secure the plate 104 to the casting 108. The mounting plate 104 also has a plurality of threaded studs 124 welded thereto. A flange 128, which is welded to the housing of the air brake cylinder 132, has holes 136 formed at its four corners. The flange 128 and cylinder 132 mate with the mounting plate 104 such that the threaded studs 124 on the plate 104 are inserted through the corresponding holes 136 in the flange 128. Nuts 140 are provided to secure the flange 128 to the plate 104.

Figure 2:
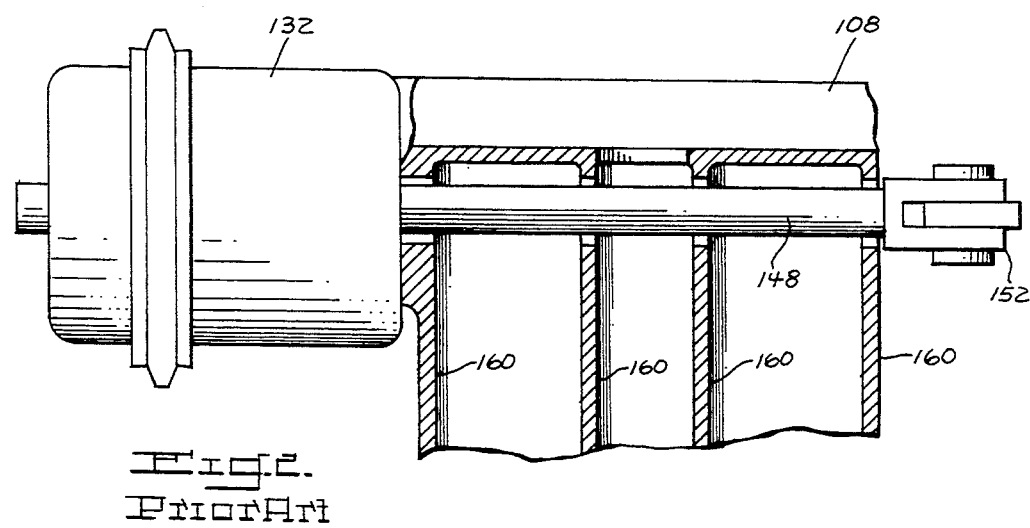
FIG. 2 is a side view, partially cut away, of the prior art scheme of FIG. 1.

Referring to FIGS. 1 and 2, there illustrated is a prior art scheme for connecting the air brake cylinder 132 to the bolster casting 108 of a railroad car. The cylinder 132 may comprise either the Model S-36, S-50 or S-60, provided by ControlAir Inc. of Amherst, N.H. The cylinder 132, which typically weighs between 60-70 pounds and is about ten inches in diameter, has an output shaft 144 that is connected to a rod 148 for effectuating a desired mechanical movement of a braking device, a portion of which is illustrated at 152. The cylinder 132 is secured to the casting 108 in the prior art by two bolts 116 shown in phantom in FIG. 1. The bolts 116 are inserted through holes in the casting and into threaded weld nuts (not shown) disposed inside the cylinder 132. The heads 156 of the bolts 116 are thus located within the interior of the bolster casting 108. The bolster casting 108 has several "fins" or "ribs" 160 integrally formed therewith that protrude downward from a top surface of the casting. Because of these fins 160 and the rod 148 connected to the shaft, the bolster casting 108 does not readily lend itself to easy accessibility by a wrench for proper torquing of the bolt heads 156. Improper torquing leads to all of the aforementioned attendant problems with the air brake cylinder 132 referred to hereinbefore in the BACKGROUND OF THE INVENTION section, including the loosening of the bolts and possible cracking of the cylinder.

Figure 3:
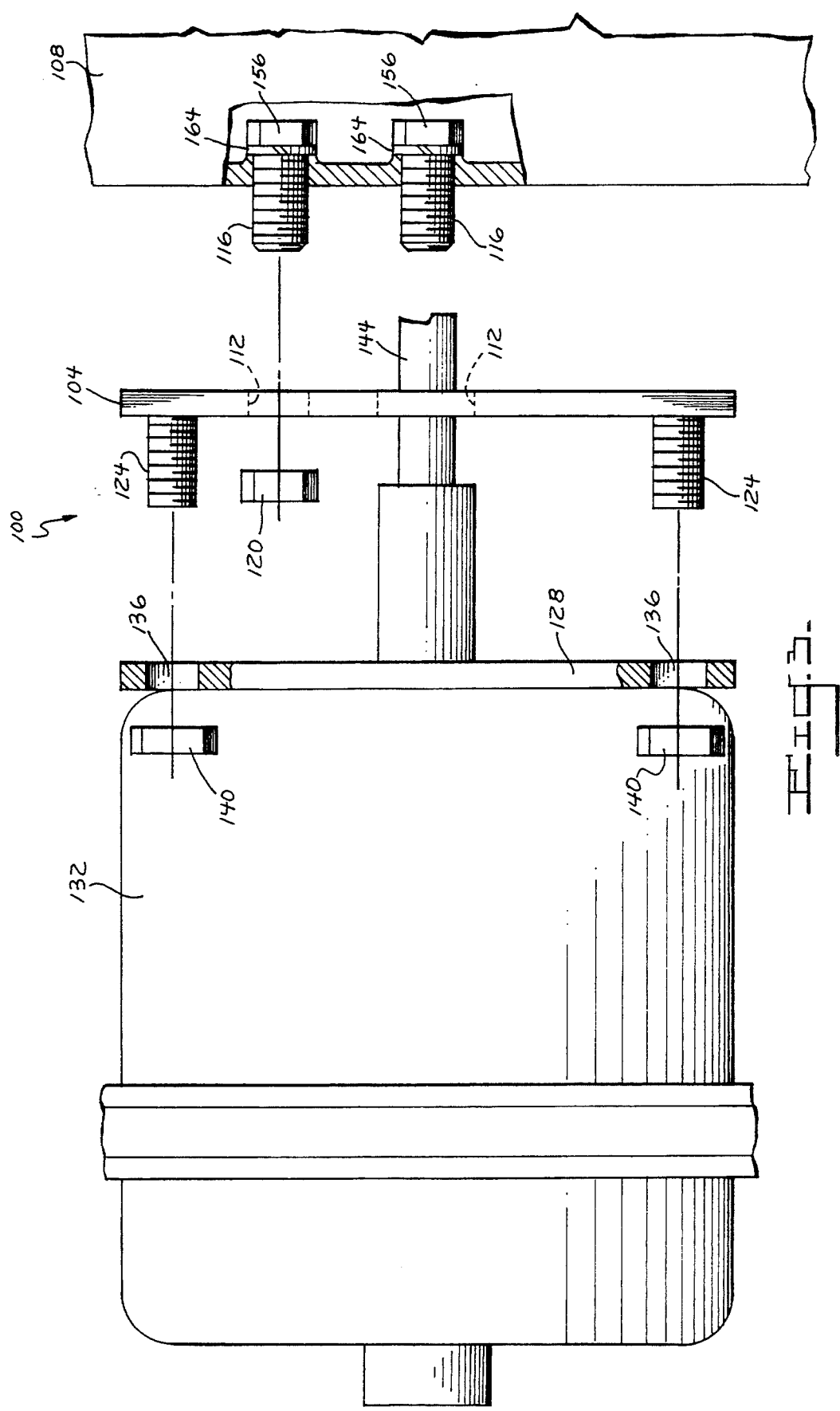
FIG. 3 is a perspective view of the unassembled apparatus of the present invention used to connect together the cylinder and bolster casting of FIG. 1.
Figure 4:
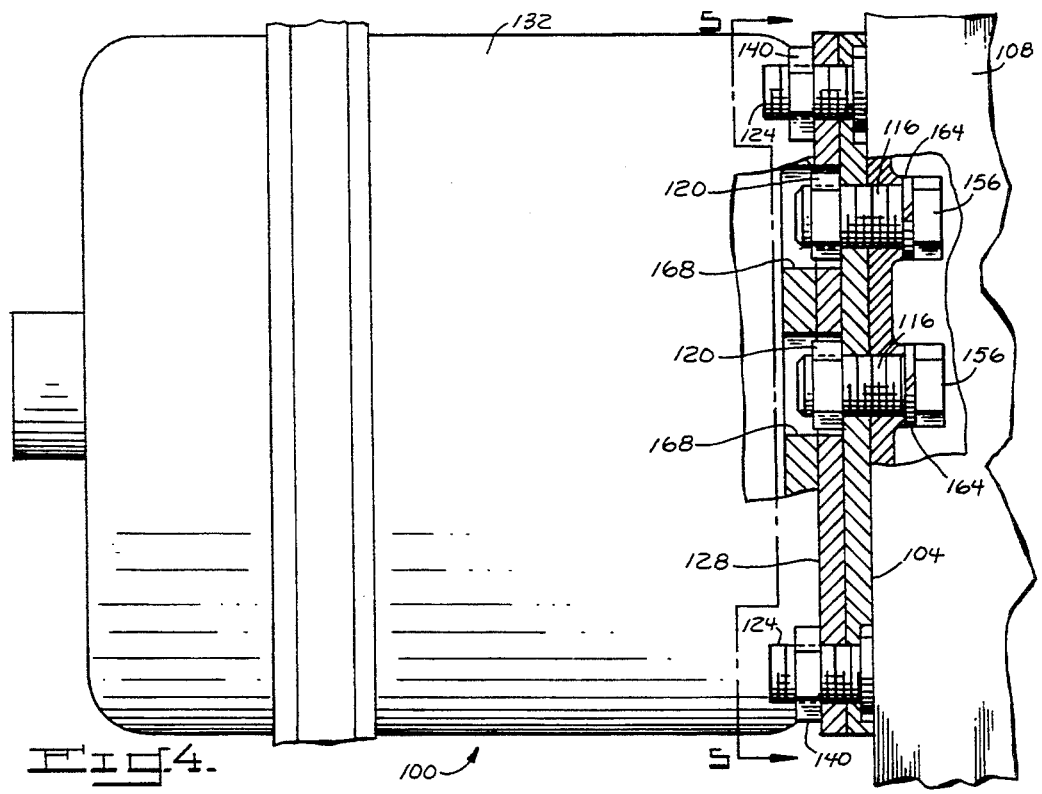
FIG. 4 is a side view, partially cut away, of the apparatus of FIG. 3 used to mount the cylinder to the bolster casting.
Figure 5:
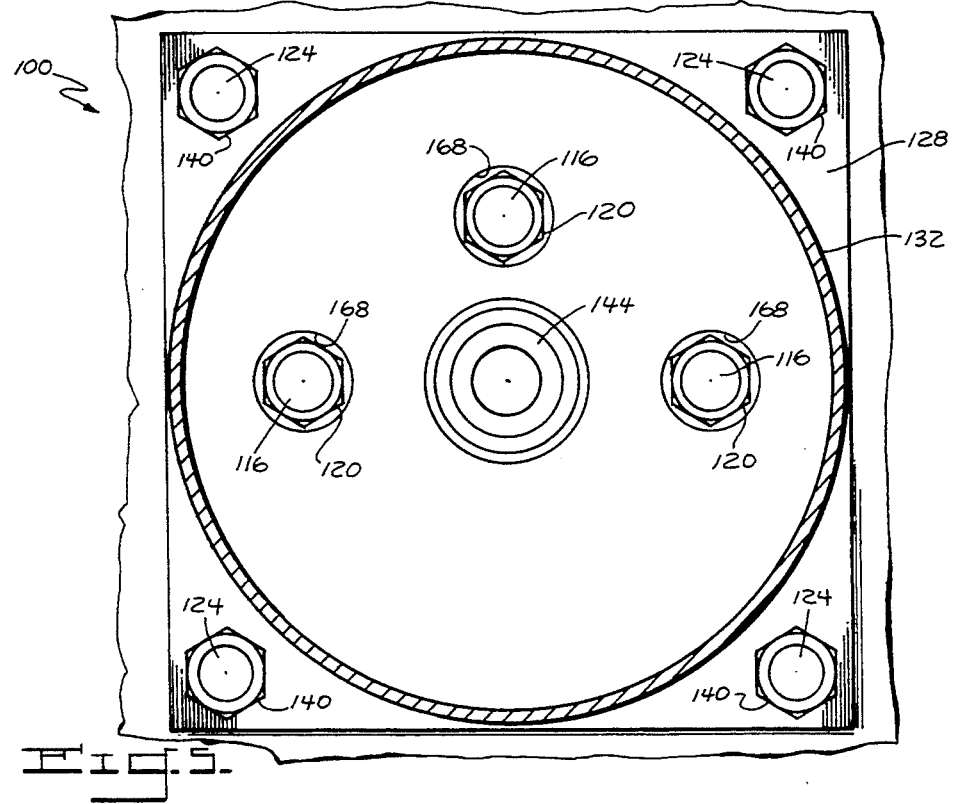
FIG. 5 is an end view of the apparatus of FIG. 4 taken along lines 5—5 of FIG. 4.

Referring to FIGS. 3–5, there illustrated is a preferred embodiment of the mounting apparatus 100 of the present invention. The mounting apparatus 100 includes an adaptor mounting plate 104. The plate 104 is generally square in configuration and has four holes formed therethrough; three of the holes 112 being the same size, while the fourth hole 112 is larger than the other three holes. For example, the larger hole 112 has a diameter of two and one-quarter inches, while the smaller three holes 112 each have a diameter of one and seven-sixteenths inches. The larger hole 112 allows the actuator portion (i.e., output shaft 144) of the air brake cylinder 132 to pass therethrough. The adaptor mounting plate 104 may comprise a steel plate approximately three-eights inch thick.

Also provided are three bolts 116 that are inserted through holes in the bolster casting 108. The bolts 116 are disposed such that the bolt heads 156 are located within the casting and rest up against the corresponding lock washers 164 that are disposed adjacent to and in an in abutting relation to the bolster casting 108. The length of the portion of each of the bolts 116 that protrude outside of the bolster casting 108 is approximately one and one-quarter inches in the preferred embodiment. The bolts 116 are inserted through the corresponding holes 112 in the adaptor mounting plate 104. Nuts 120 are threaded onto the bolts 116 to secure the mounting plate 104 to the bolster casting 108 in a contiguous relationship thereto. With the adaptor mounting plate 104 assembled to the bolster casting 108 in such manner, a portion of the bolt 116 and corresponding nut 120 will both protrude from the left surface of the adaptor mounting plate 104.

The adaptor mounting plate 104 also includes four threaded members 124, such as bolts, that are attached to the adaptor mounting plate. In the preferred embodiment, countersunk or counterbored holes are formed in the adaptor mounting plate 104 and the bolts 124 are inserted into the plate 104 such that the bolt heads rest within the countersunk or counterbored holes. The bolts 124 are then welded to the plate 104. The threaded portion of the bolts 124 protrude from the adaptor mounting plate 104 surface at a distance of approximately one and one-quarter inches.

In accordance with the invention, the air brake cylinder 132 has a square mounting flange 128 fixedly attached thereto by, e.g., welding. The flange 128 may comprise a steel plate approximately one-quarter inch thick. Four corresponding throughbores 136 are formed in the flange 128 near the outer four corners of the square-shaped flange. In assembling the cylinder 132 to the adaptor mounting plate 104, the four welded studs 124 are inserted through the corresponding holes 136 in the flange 128. Associated nuts 140 securely attach the flange 128 and cylinder 132 to the adaptor mounting plate 104.

When assembling the cylinder 132 to the bolster casting 108 using the mounting apparatus 100 of the present invention, a person must initially reach inside the bolster casting 108 and place the three bolts 116 with their corresponding lock washers 164 such that the threaded portion of the bolts 116 protrude through the holes in the bolster casting 108, while the bolt heads 156 remain within the interior of the bolster casting 108. If desired, the bolts 116 may be loosely held in place by placing a piece of tape over the bolt heads 156 in contact with the bolster casting. This is acceptable since there will be no need to place a wrench on the bolt heads 156 because there will be no torque applied to the bolt heads 156 by a wrench, in contrast to the prior art. The person then places the adaptor mounting plate 104 such that the three smaller holes 112 formed in the adaptor mounting plate 104 are placed over the three bolts 116 that protrude from the bolster casting 108. The corresponding nuts 120 are then torqued to secure the plate 104 contiguous to the bolster casting 108. In this way, the present invention overcomes the main problem with the prior art since the person is now able to torque the plate 104 to the bolster casting 108 from the outside of the bolster casting 108 where it is much easier to apply the correct torque to the bolts 116. When torquing the nuts 120 onto the bolts 116, the lock washers 164 disposed between the bolt heads 156 and the inside bolster casting surface should suffice to keep the bolts 116 from turning while torque is applied to the bolts 116.

After the adaptor mounting plate 104 is secured to the bolster casting 108, the air brake cylinder 132 with its associated mounting flange 128 is placed into position such that the four outer holes 136 in the mounting flange 128 are placed over the corresponding four bolts 124 welded to the adaptor mounting plate 104. The mounting flange 128 is placed flush with the surface of the adaptor mounting plate 104. This flush positioning is provided for by having three additional holes 168 formed in the flange 128 and also the air brake cylinder 132 at corresponding locations. The holes 168, which have a diameter of approximately one and seven-sixteenths inches in the preferred embodiment, accommodate both the portion of the three bolts 116 that are inserted through the bolster casting 108 and adaptor mounting plate 104, along with their corresponding nuts 120. Thus, placing the cylinder 132 and its flange 128 onto the four bolts 124 of the plate 104 is analogous to "changing a tire on an automobile". That is, the cylinder rests on the plate much like a tire rests on the wheel. Then, in a like manner to torquing the wheel lugs on a tire, the nuts 140 are easily torqued onto the bolts 124 by a single person without also having to hold or prop up the cylinder 132 until the nuts 140 are sufficiently torqued.

As can be seen from the foregoing, the mounting apparatus 100 of the present invention overcomes the prior art deficiencies by obviating the need to attempt to properly torque the bolts 116 from the inside of the bolster casting 108. The mounting apparatus 100 of the present invention is operable instead to allow a single person to attach the air brake cylinder 132 to the bolster casting 108 by torquing nuts 120 onto bolts 116 from the outside of the bolster casting 108, where it is more convenient to apply the proper torque to the bolts 116 and corresponding nuts 120. Thus, the mounting apparatus 100 of the present invention eliminates the prior art need for two people to attempt to attach the cylinder 132 to the bolster casting 108. That is, with the present invention, a single person can now perform the entire assembly operation. In a sense, the cylinder 132, with its welded mounting flange 128, is mounted to the four studs 124 of the plate 104 in an analogous manner to a tire mounted onto a wheel of a automobile.

The present invention has been described for use with an air brake cylinder 132 having three holes 168 formed on the interior of the cylinder. These three holes 168 are typically found on the Model S-60 air brake cylinder provided by ControlAir Inc. of Amherst, N.H. In the prior art, such holes were provided with a welded nut affixed thereto to carry out the prior art mounting scheme described earlier. However, the welded nuts are not utilized in the present invention. Yet, these holes 168 formed in the air brake cylinder are enlarged somewhat to accommodate the bolts 116 that protrude through the bolster casting 108 and adaptor mounting plate 104 along with the corresponding nuts 120. This allows the mounting flange 128 to sit flush against the adaptor mounting plate 104. In contrast, a Model S-36 or S-50 air brake cylinder 132 provided by ControlAir Inc. of Amherst, N.H. has only two holes 168 formed in the interior of the cylinder. Thus, for use of such cylinder 132 with the mounting apparatus 100 of the present invention, the adaptor mounting plate 104 need only require two holes 168 formed therein. Also, only two bolts 116 are inserted through the bolster casting 108 and adapting mounting plate 104.

However, it is to be understood that the present invention is not limited to such specific models of air brake cylinders 132. Other cylinders 132 may be used by one of ordinary skill in the art in light of the teachings herein. Further, the mounting flange 128 and adaptor mounting plate 104 have been described as being square in shape and made of steel. However, such characteristics are purely exemplary. Other shapes and/or materials may be used without limitation. Also, the present invention has been described as having bolts 124 welded to the adaptor mounting plate 104. However, it is to be understood that such arrangement is purely exemplary. The bolts 124 may be secured within the plate 104 by other means, or may be simply placed within countersunk or counterbored holes. For that matter, other means besides bolts 124 may be used to secure both the plate 104 to the bolster casting 108, and also the flange 128 to the adaptor mounting plate 104. It suffice for the present invention that such means be provided to secure these parts such that a person does not have to apply torque to the bolts 116 from the inside of the bolster casting 108.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. Apparatus for mounting a railroad air brake cylinder to a bolster casting of a railroad car, comprising:
   a. a flange attached to the cylinder;
   b. a mounting plate disposed between the flange and the bolster casting;
   c. means for attaching the flange to the mounting plate; and
   d. means for attaching the mounting plate to the bolster casting.

2. The apparatus of claim 1, wherein the means for attaching the flange to the mounting plate includes at least one bolt and corresponding nut.

3. The apparatus of claim 1, wherein the flange has at least one hole formed therein, and wherein the means for attaching the flange to the mounting plate includes at least one bolt and corresponding nut, the bolt being disposed through the corresponding hole in the flange.

4. The apparatus of claim 3, wherein the bolt is fixedly attached to the mounting plate.

5. The apparatus of claim 3, wherein the bolt is welded to the mounting plate.

6. The apparatus of claim 1, wherein the means for attaching the mounting plate to the bolster casting includes at least one bolt and corresponding nut.

7. The apparatus of claim 1, wherein the flange is disposed adjacent to and in abutting relation to the mounting plate, and wherein the mounting plate is disposed adjacent to and in abutting relation to the bolster casting.

8. The apparatus of claim 1, wherein the means for attaching the flange to the mounting plate comprises means for securing the flange adjacent to, and in an abutting relation to, the mounting plate.

9. The apparatus of claim 1, wherein the means for attaching the mounting plate to the bolster casting comprises means for securing the mounting plate adjacent to, and in abutting relation to, the bolster casting.

10. Apparatus for mounting a railroad air brake cylinder to a bolster casting of a railroad car, comprising:
    a. a flange attached to the cylinder, the flange having a plurality of holes formed therein;
    b. a mounting plate, disposed between the flange and the bolster casting, the mounting plate having a plurality of holes formed therein, the mounting plate having a plurality of bolts attached thereto, the bolts being inserted into the corresponding plurality of holes in the flange, the flange being secured to the mounting plate by nuts torqued onto the corresponding bolts attached to the plate and inserted into the plurality of holes in the flange; and
    c. a plurality of bolts inserted both through corresponding holes in the bolster casting and through the corresponding holes in the mounting plate, the mounting plate being secured to the bolster casting by nuts torqued onto the bolts inserted through the holes in the bolster casting and the mounting plate.

11. The apparatus of claim 10, wherein the flange is disposed adjacent to and in abutting relation to the mounting plate, and wherein the mounting plate is disposed adjacent to and in abutting relation to the bolster casting.

12. The apparatus of claim 10, wherein the plurality of bolts are welded to the mounting plate.

13. Apparatus for mounting a railroad air brake cylinder to a bolster casting of a railroad car, comprising:
    a. a flange attached to the cylinder, the flange having at least one hole formed therein;
    b. a mounting plate, disposed between the flange and the bolster casting in a contiguous relationship therebetween, the mounting plate having at least one hole formed therein, the mounting plate having at least one bolt attached thereto, the bolt being inserted into the corresponding hole in the flange, the flange being secured to the mounting plate by a nut torqued onto the corresponding bolt attached to the mounting plate and inserted into the hole in the flange; and c. at least one bolt inserted through the corresponding hole in the bolster casting and through the corresponding hole in the mounting plate, the mounting plate being secured to the bolster casting by a nut torqued onto the bolt inserted through the hole in the bolster casting and in the mounting plate.

* * * * *